(12) United States Patent
Park (10) Patent No.: US 8,396,462 B2
(45) Date of Patent: Mar. 12, 2013

(54) METHOD OF SEARCHING FOR LOST CHILD USING TWO-DIMENSIONAL BAR CODE

(75) Inventor: Heewoon Park, Gwacheon-si (KR)

(73) Assignee: Portpolio Co., Ltd., Seoul (KR)

( * ) Notice: Subject to any disclaimer, the term of this patent is extended or adjusted under 35 U.S.C. 154(b) by 0 days.

(21) Appl. No.: 13/252,774

(22) Filed: Oct. 4, 2011

(65) Prior Publication Data

US 2012/0264456 A1     Oct. 18, 2012

(30) Foreign Application Priority Data

Oct. 4, 2010    (KR) .................. 10-2010-0096351

(51) Int. Cl.
*H04M 3/00*      (2006.01)

(52) U.S. Cl. .................. 455/418; 455/414.1; 455/456.1; 340/539.15

(58) Field of Classification Search .................. 455/418, 455/414.1, 456.1; 340/539.15
See application file for complete search history.

(56) References Cited

U.S. PATENT DOCUMENTS

| | | | |
|---|---|---|---|
| 6,283,065 B1* | 9/2001 | Shorrock et al. | 119/863 |
| 7,216,109 B1* | 5/2007 | Donner | 705/64 |
| 7,415,424 B1* | 8/2008 | Donner | 705/5 |
| 7,562,051 B1* | 7/2009 | Donner | 705/67 |
| 7,565,328 B1* | 7/2009 | Donner | 705/67 |
| 2002/0143559 A1* | 10/2002 | Sansone | 705/1 |
| 2011/0010971 A1* | 1/2011 | Erickson et al. | 40/300 |
| 2011/0025040 A1* | 2/2011 | Dominguez et al. | 283/75 |

* cited by examiner

*Primary Examiner* — Danh Le
(74) *Attorney, Agent, or Firm* — Sherr & Jiang, PLLC

(57) ABSTRACT

Various embodiments of a searching method for a missing child using a two-dimensional bar code are disclosed. In one exemplary embodiment, the method may include photographing a two-dimensional bar code possessed by a missing child through a missing child prevention program and receiving current position information through a GPS module and stores the received position information. The method may also include transmitting the two-dimensional bar code and the stored position information to a two-dimensional barcode server, receiving child and guardian information of the missing child from the two-dimensional bar code server, and displaying the received child and guardian information. The method may also include connecting a call to the missing child's guardian by inputting a call connection key.

7 Claims, 7 Drawing Sheets

SCREEN FOR RECOGNIZING
TWO-DIMENSIONAL BAR CODE IN
MISSING CHILD FINDER CLIENT

FOCUS TWO-DIMENSIONAL
BAR CODE OF CHILD'S CLOTHES
IN SQUARE OF SCREEN
KEEP EXACT FOCUS

CAMERA SCREEN (b)

SCREEN FOR CHILD INFORMATION
IN MISSING CHILD FINDER CLIENT

NAME : OOO
AGE : O
BLOOD TYPE : O

LOOKS
AND CLOTHES
OOOOOOO
OOOOOOO
OOOOOOO
OOOOOOO

CONTACT NUMBER :
OOO-OOO-OOOO
OOO-OOOO-OOOO

ADDRESS :
(#OO-OOO, OOO APARTMENT,
OOO-OO, OO-DONG,
OO-GU, SEOUL)

CALL TO CONTACT NUMBER 1

CALL TO CONTACT NUMBER 2

FIG. 7

SCREEN TRANSMITTED
TO WHOLE USERS WHEN
MISSING CHILD OCCURS

PLEASE, SEARCH FOR CHIL'S GUARDIAN

NAME : ○○○
AGE : ○
LOOKS
AND CLOTHES
○○○○○○○○
○○○○○○○
○○○○○○○
○○○○○○○

MISSING CHILD OCCURRENCE AREA

MAP

FIG. 8

METHOD OF SEARCHING FOR LOST CHILD USING TWO-DIMENSIONAL BAR CODE

CROSS-REFERENCE TO RELATED APPLICATION

This application claims the benefit of Korean Patent Application No. 2010-0096351, filed Oct. 4, 2010, the disclosure of which is hereby incorporated herein by reference in its entirety.

BACKGROUND OF THE INVENTION

1. Field of the Invention

An aspect of the present invention relates to a method for searching a missing or lost child, and more particularly, to a method for searching and finding a missing child using a two-dimensional bar code that contain, for example, child information and child guardian information. For example, the two-dimensional bar code may be attached to a child, so that when the child is missing or lost, a finder of the child can easily obtain the child information and the child's guardian information without openly exposing the child information and the child guardian information.

2. Description of the Related Art

In general, many children get lost in crowded and fast-moving places, such as amusement parks, museums, department stores, tourist resorts, and stadiums. Various schemes have been devised to safely hand over such missing children to their parents or guardians.

For example, a method of allowing a child to wear a bracelet or necklace is used as one of the most common methods for identifying the lost or missing child and handing over the missing child to his or her parents or guardians. Here, a contact address of a child's guardian is provided to the bracelet or necklace.

In this method, however, a finder or temporary guardian of the missing child can obtain the contact information of the child's guardian directly from the bracelet or necklace. As a result, the contact information of the child's guardian is exposed to the public and may be used in a crime. Further, if a child does not want to wear such a bracelet or necklace, there may be no way that the child can possess information about his or her guardian.

SUMMARY OF THE INVENTION

Accordingly, there is a need for an improved a method for searching, finding, and/or locating missing children that may obviate one or more of the above-mentioned problems or disadvantages.

For example, various embodiments of the present invention may provide a method of searching, finding, and/or locating a missing child using a two-dimensional bar code. More specifically, child and guardian information, typically contained in a name tag or bracelet carried by a child, is issued as a two-dimensional bar code, and the bar code can be attached to a child's clothing or worn on the child's body (e.g., arm), so that the child and guardian information cannot be easily exposed to other persons when the child wears the two-dimensional bar code.

Embodiments of the present invention also provide a missing child searching method using a two-dimensional bar code, in which if a person photographs a two-dimensional bar code attached to clothes or name tag of a missing child and transmits the photographed two-dimensional bar code to a two-dimensional bar-code server for missing child prevention, the two-dimensional bar-code server transmits guardian information of the missing child to the person, so that it is possible to quickly hand over the missing child to a missing child's guardian.

According to an aspect of the present invention, there is provided a method of searching a missing child using a two-dimensional bar code, which is performed by a portable terminal. The method may comprise: photographing a two-dimensional bar code possessed by a missing child through a missing child prevention program; receiving current position information through a global positioning system (GPS) module and storing the received position information when the missing child prevention program is executed; transmitting the photographed two-dimensional bar code and the stored position information to a two-dimensional bar-code server; receiving child and guardian information of the missing child from the two-dimensional bar-code server and displaying the received child and guardian information; and connecting a call to the missing child's guardian by inputting a call connection key.

Prior to photographing the two-dimensional bar code, the method may further include: receiving child and guardian information through the missing child prevention program; transmitting the child and guardian information to the two-dimensional bar-code server and requesting the two-dimensional bar-code server to generate the two-dimensional bar code; and receiving the two-dimensional bar code corresponding to the child and guardian information from the two-dimensional bar-code server.

Another aspect of the present invention may provide a method of searching for a missing child using a two-dimensional bar code, which is performed by a two-dimensional bar-code server. The method may include: receiving, from a missing child finder client, a two-dimensional bar code possessed by a missing child and photographed by the missing child finder client and position information of the missing child finder client; searching for child and guardian information corresponding to the two-dimensional bar code; transmitting the searched child and guardian information to the missing child finder client; transmitting the information and position information of the missing child finder client to a missing child's guardian using the searched guardian information; and generating missing child occurrence information containing the child information and the position information of the missing child finder client and transmitting the generated missing child occurrence information to members that install a missing child prevention program.

Prior to receiving the two-dimensional bar code from the missing child finder client, the method may further include: receiving child and guardian information from a guardian client; and generating a two-dimensional bar code corresponding to the received child and guardian information and transmitting the generated two-dimensional bar code to the guardian client.

The guardian information may be at least one portable terminal number or telephone number, and the guardian information receiving the information and position information of the missing child finder client may be a portable terminal number.

According to still another aspect of the present invention, there is provided a method of searching for a missing child using a two-dimensional bar code, comprising: photographing, by a missing child finder client, a two-dimensional bar code possessed by a missing child through a missing child prevention program, and receiving current position information through a GPS module and storing the received position information; transmitting the photographed two-dimensional bar code and the stored position information to a two-dimensional bar-code server; searching for, by the two-dimensional bar-code server, child and guardian information corresponding to the two-dimensional bar code received from the missing child finder client; transmitting, by the two-dimensional bar-code server, the searched child and guardian information to the missing child finder client; receiving, by the missing child finder client, the child and guardian information of the missing child from the two-dimensional bar-code server and displaying the received child and guardian information; and connecting, by the missing child finder client, a call to a missing child's guardian using the received guardian information.

The guardian information may be at least one of a portable terminal number and a telephone number.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate various embodiments consistent with the invention and, together with the description, serve to explain the principles of the invention.

DETAILED DESCRIPTION OF THE INVENTION

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

Figure 1:
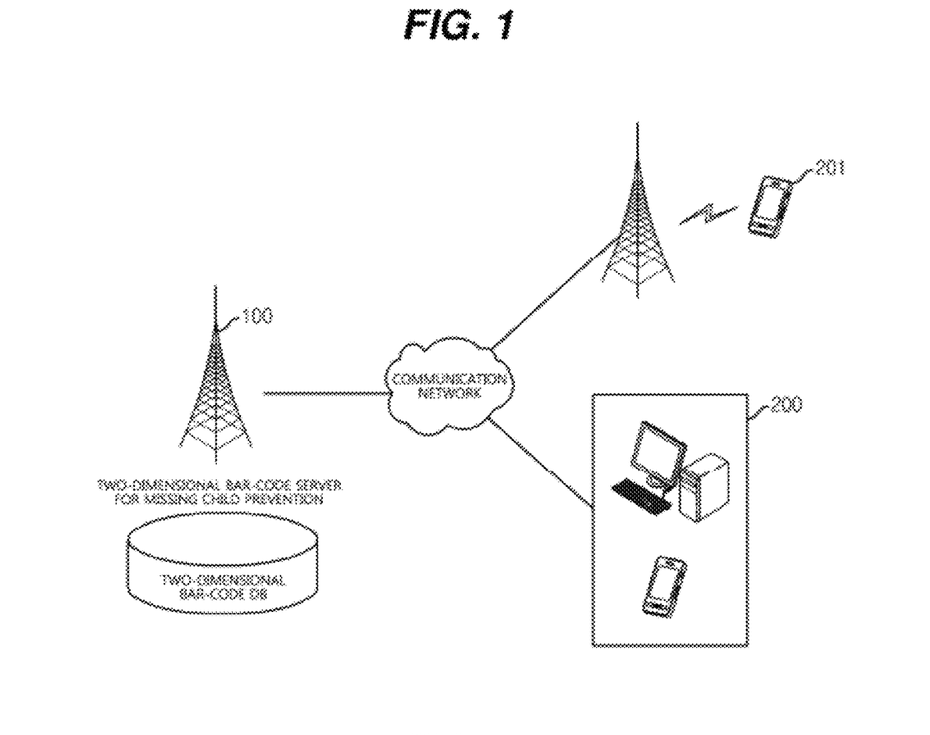
FIG. 1 is a configuration view of a missing child searching system using a two-dimensional bar code according to an embodiment of the present invention.

FIG. 1 is a configuration view of a missing child searching system using a two-dimensional bar code according to an embodiment of the present invention.

A two-dimensional bar-code server 100 for missing child prevention includes a two-dimensional bar-code database containing information of members that have received two-dimensional bar codes issued through a missing child prevention program. If the two-dimensional bar-code server 100 receives child and guardian information from a child and guardian client 200, the two-dimensional bar-code server 100 generates a two-dimensional bar code corresponding to the received child and guardian information.

The two-dimensional bar-code server 100 transmits the generated two-dimensional bar code to the child and guardian client 200. Then, the two-dimensional bar-code server 100 matches the two-dimensional bar code to the child and parent information and stores the matched result in the two-dimensional bar-code database. Here, the two-dimensional bar code may be PDF417, Datamatrix, QRcode or Maxicode.

If the two-dimensional bar-code server 100 receives a two-dimensional bar code and position information of a missing child finder client 201 from the missing child finder client 201, the two-dimensional bar-code server 100 determine whether or not the missing child finder client 201 is a member registered in the missing child prevention program. In a case where it is determined that the missing child finder client 201 is a member, the two-dimensional bar-code server 100 searches through the two-dimensional bar-code database to retrieve the child and guardian information corresponding to the received two-dimensional bar code.

The two-dimensional bar-code server 100 then may transmit the retrieved child and guardian information to the missing child finder client 201.

Alternatively or additionally, the two-dimensional bar-code server 100 may transmit the information and position information of the missing child finder client 201 to a guardian client 200 corresponding to the child and guardian information.

The guardian client 200 may be connected to the two-dimensional bar-code server 100, download the missing child prevention program, and install the downloaded program in the guardian client 200. If the guardian client 200 receives child and guardian information inputted from a user through the missing child prevention program, the guardian client 200 may transmit the inputted child and guardian information to the two-dimensional bar-code server 100.

The guardian client 200 receives a two-dimensional bar code corresponding to the child and guardian information from the two-dimensional bar-code server 100.

In this case, the guardian client 200 may request the two-dimensional bar-code server 100 to generate a two-dimensional bar code through a device such as a portable terminal, laptop computer or notebook computer, which can perform wired/wireless communications.

Thereafter, in a case where a missing child occurs, the guardian client 200 receives information and position information of the missing child finder client 201 from the two-dimensional bar-code server 100 to display the received information. In this case, the guardian client 200 is preferably a portable terminal corresponding to guardian information.

When finding a missing child, the missing child finder client 201 photographs a two-dimensional bar code possessed by the missing child through the missing child prevention program, and collects current position information through a global positioning system (GPS) module when the missing child prevention program is executed.

The missing child finder client 201 transmits the photographed two-dimensional bar code and the collected position information to the two-dimensional bar-code server 100.

The missing child finder client 201 receives child and guardian information of the missing child from the two-dimensional bar-code server 100 to display the received information, and attempts a connecting call to the guardian client 200 using the guardian information.

Although the guardian client 200 and the missing child finder client 201 have been separately described above, it will be apparent that all functions of the guardian client 200 and the missing child finder client 201 may be performed using a portable terminal capable of performing wired/wireless communications.

Figure 2:
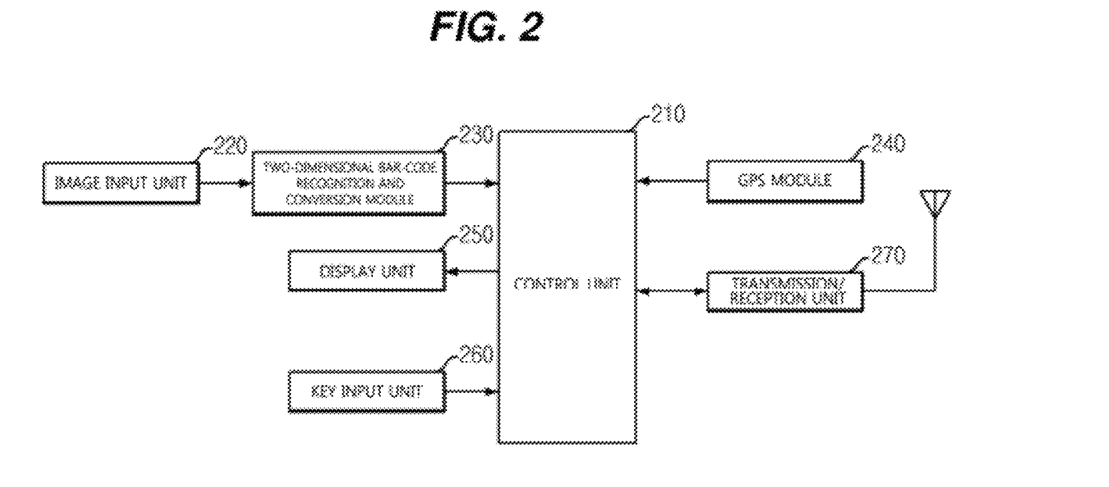
FIG. 2 is an internal configuration view of a portable terminal corresponding to a missing child finder client which performs a missing child search using a two-dimensional bar code according to an embodiment of the present invention.

FIG. 2 is an internal configuration view of a portable terminal corresponding to a missing child finder client that performs a missing child search using a two-dimensional bar code according to an embodiment of the present invention.

A control unit 210 functions to control a general operation of the portable terminal that is the missing child finder client 201. If the missing child prevention program is executed, the control unit 210 controls an image input unit 220 to photograph a two-dimensional bar code possessed by a missing child.

If the missing child prevention program is executed, the control unit 210 controls a GPS module 240 to collect and store current position information of the missing child finder client 201.

The control unit 210 controls a transmission/reception unit 270 to transmit the photographed two-dimensional bar code and the collected position information to the two-dimensional bar-code server 100.

Thereafter, if the control unit 210 receives child and guardian information of the missing child from the two-dimensional bar-code server 100 through the transmission/reception unit 270, the control unit 210 controls a display unit 250 to display the received child and guardian information.

The image input unit 220 receives image data, and transmits the received image data to the control unit 210 through a two-dimensional bar-code recognition and conversion module 230.

If the two-dimensional bar-code recognition and conversion module 230 receives a two-dimensional bar code from the image input unit 220, the two-dimensional bar-code recognition and conversion module 230 converts the received two-dimensional bar-code into data and then transmits the converted data to the control unit 210.

If the missing child prevention program is executed, the GPS module 240 collects coordinate data on the current position of the missing child finder client 201 through communication with the GPS module 240, and transmits position information on the collected coordinate data to the control unit 210.

The display unit 250 displays the photographed two-dimensional bar code under a control of the control unit 210, and displays the child and guardian information of the missing child, transmitted from the two-dimensional bar-code server 100 through the transmission/reception unit 270.

A key input unit 260 may be implemented using not only a key matrix structure but also a touch screen method together with the display unit 250.

The transmission/reception unit 270 functions to transmit/receive data. Particularly, the transmission/reception unit 270 transmits the two-dimensional bar code photographed under the control of the control unit 210 and the position information collected through the GPS module 240 to the two-dimensional bar-code server 100.

The transmission/reception unit 270 receives the child and guardian information of the missing child from two-dimensional bar-code server 100.

Figure 3:
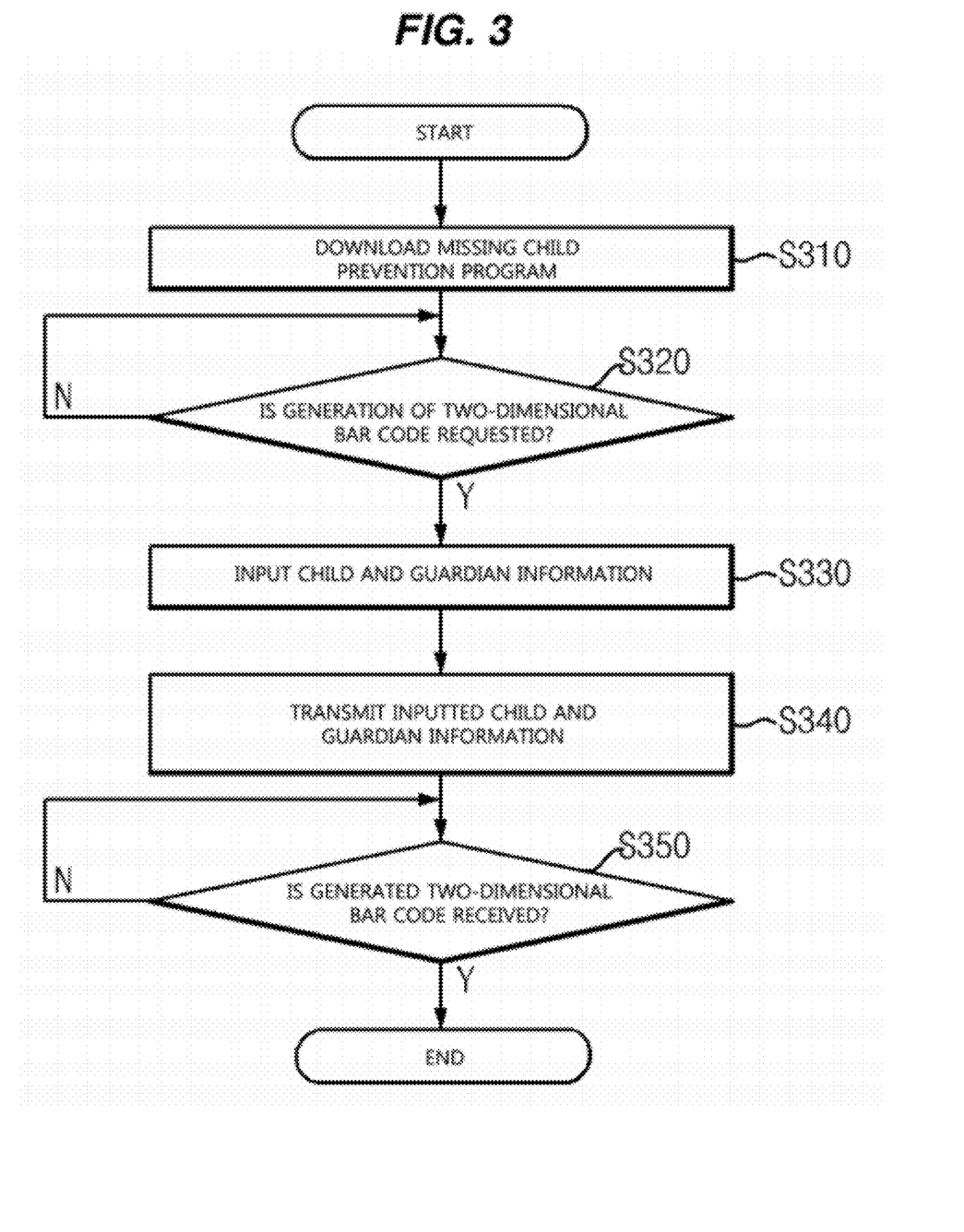
FIG. 3 is a flowchart illustrating a process in which a guardian client receives a two-dimensional bar code according to an embodiment of the present invention.

FIG. 3 is a flowchart illustrating a process in which a guardian client receives a two-dimensional bar code according to an embodiment of the present invention.

In step S310, the guardian client 200 connected to the two-dimensional bar-code server 100 downloads a missing child prevention program and then installs the downloaded program in the guardian client 200.

If the generation of a two-dimensional bar code is requested through the missing child prevention program in step S320, the guardian client 200 receives child and guardian information necessary for the generation of the two-dimensional bar code in step S330.

If the guardian client 200 receives child and guardian information from a user in the step S330, the guardian client 200 transmits the received child and guardian information to the two-dimensional bar-code server 100 in step S340.

If the guardian client 200 receives a two-dimensional bar code on the transmitted child and guardian information from the two-dimensional bar-code server 100 in step S350, the guardian client 200 stores the received two-dimensional bar code.

Thereafter, the guardian client 200 outputs the two-dimensional bar code transmitted from the two-dimensional bar-code server 100. Here, the outputted two-dimensional bar code may be attached to a missing child prevention tag of a child, or may be printed on clothes of the child.

Figure 4:
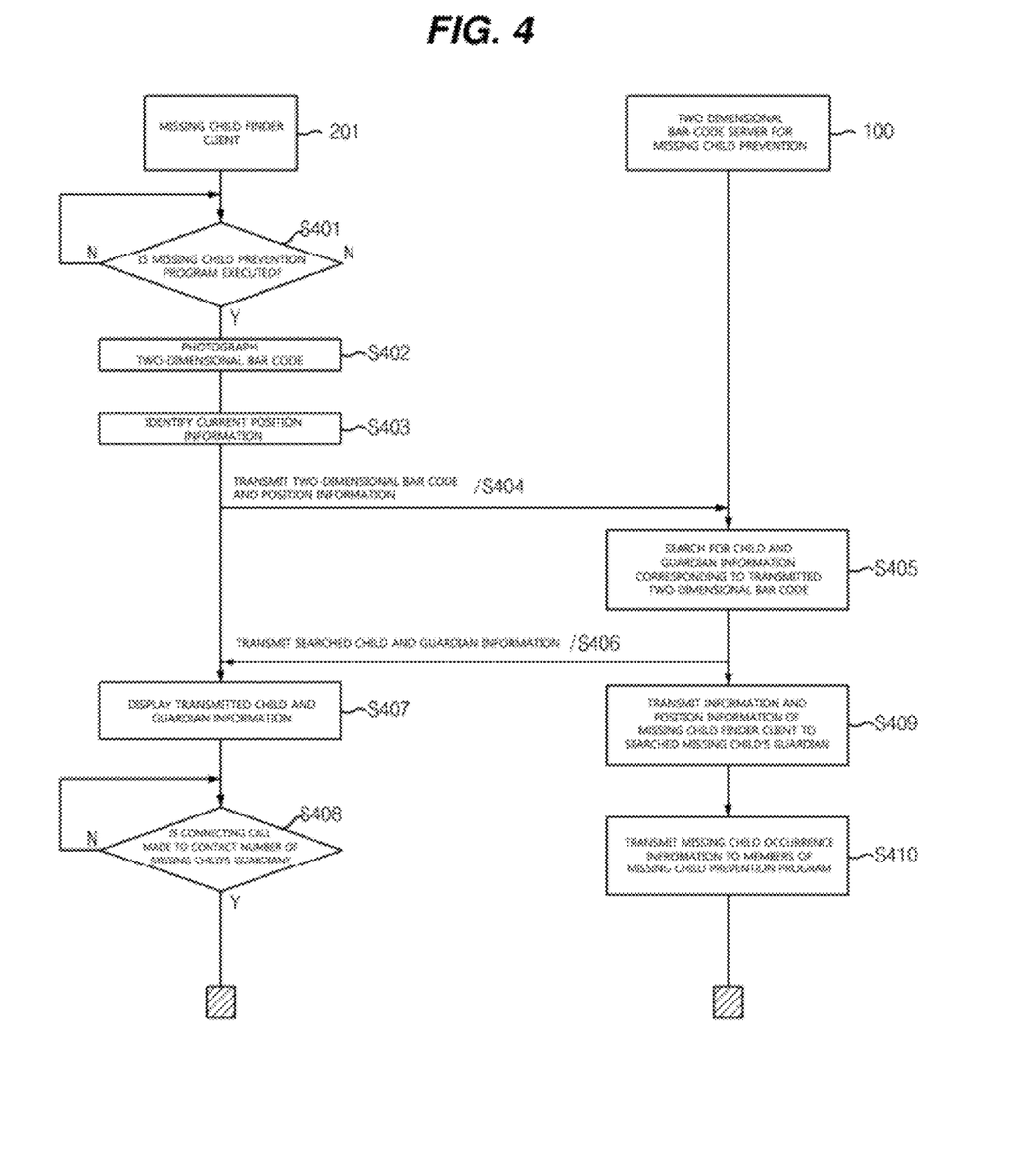
FIG. 4 is a flowchart illustrating a process of performing a missing child search using a two-dimensional bar code according to an embodiment of the present invention.
Figure 5:
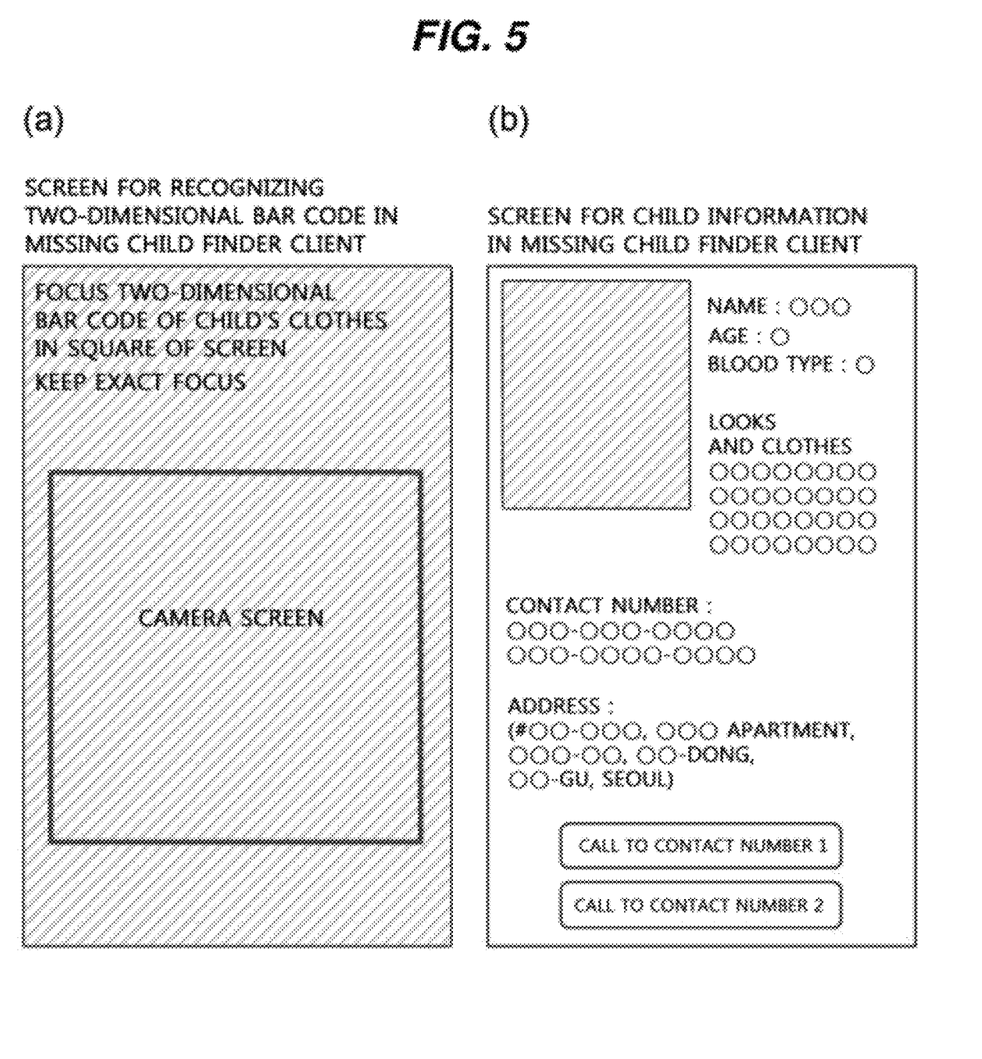
FIG. 5 is an exemplary view of a screen of the portable terminal corresponding to the missing child finder client that performs the missing child search using the two-dimensional bar code according to the embodiment of the present invention.
Figure 6:
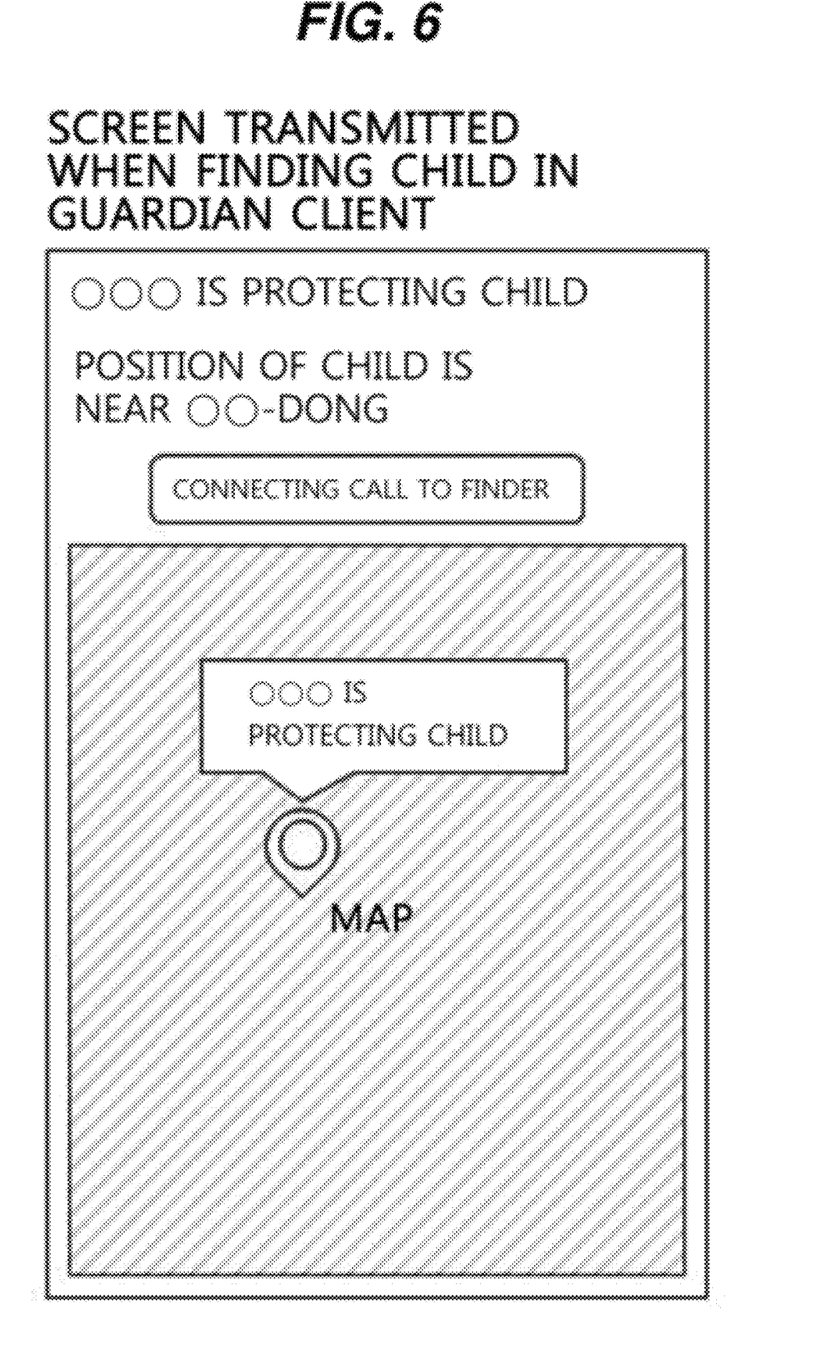
FIG. 6 is an exemplary view of a screen showing information transmitted to a portable terminal for the child guardian client according to the embodiment of the present invention.
Figure 7:
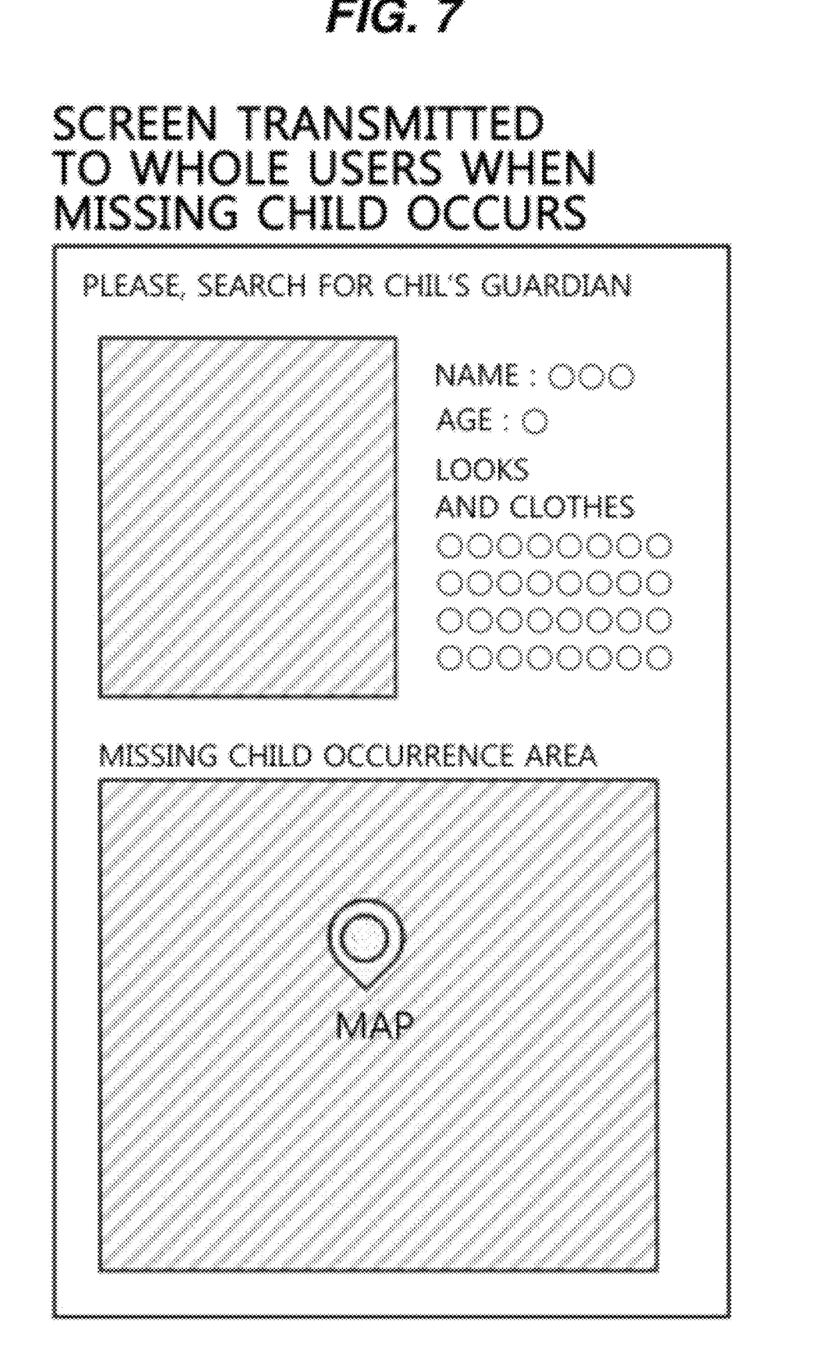
FIG. 7 is an exemplary view of a screen showing missing child occurrence information transmitted to members that have received two-dimensional bar codes issued through a two-dimensional bar-code server for missing child prevention according to the embodiment of the present invention.

FIG. 4 is a flowchart illustrating a process of performing a missing child search using a two-dimensional bar code according to an embodiment of the present invention. FIG. 5 is an exemplary view of a screen of the portable terminal corresponding to the missing child finder client that performs the missing child search using the two-dimensional bar code according to the embodiment of the present invention. FIG. 6 is an exemplary view of a screen showing information transmitted to a portable terminal for the child guardian client according to the embodiment of the present invention. FIG. 7 is an exemplary view of a screen showing missing child occurrence information transmitted to members that have received two-dimensional bar codes issued through a two-dimensional bar-code server according to the embodiment of the present invention.

If a missing child program is executed in step S401, the missing child finder client 201 photographs a two-dimensional bar code possessed by a missing child in step S402. In this case, a screen for photographing the two-dimensional bar code possessed by the missing child, as shown in FIG. 5(a), is displayed in a portable terminal corresponding to the missing child finder client 201.

If the missing child program is executed in the step S401, the missing child finder client 201 collects current position information through the GPS module 240 in step S403.

In step S404, the missing child finder client 201 transmits the two-dimensional bar code photographed in the step S402 and the current position information collected in the step S403 to the two-dimensional bar-code server 100.

If the two-dimensional bar-code server 100 receives the photographed two-dimensional bar code and the current position information from the missing child finder client 201, the two-dimensional bar-code server 100 searches for child and guardian information corresponding to the received two-dimensional bar code in step S405.

In step S406, the two-dimensional bar-code server 100 transmits the searched child and guardian information to the missing child finder client 201.

If the missing child finder client 201 receives the child and guardian information of the missing child from the two-dimensional bar-code server 100, the missing child finder client 201 displays the received child and guardian information in step S407. In this case, the photograph, name, age, blood type, and looks and clothes of the missing child, as shown in FIG. 5(b), may be displayed on a screen of the portable terminal corresponding to the missing child finder client 201, and the telephone number and address of a missing child's guardian are also displayed on the screen. In addition, a key for attempting a directly connecting call to the missing child's guardian, as shown in FIG. 5(b), is displayed on the screen according to functions of the portable terminal.

If the key for attempting a connecting call to a contact number of the missing child's guardian while displaying the child and guardian information as shown in FIG. 5(b), the missing child finder client 201 attempts the connecting call to the contact address of the missing child's guardian in step S408.

In this case, the method of making the connecting call to the missing child's guardian may include a method of receiving a specific key capable of immediately making a connection call to a contact number 1 or 2 corresponding to the guardian information as shown in FIG. 5(b) and a method in which when a key for connecting call is inputted by a user, the inputted key is connected to any one of the contact numbers 1 and 2.

In addition, the user may attempt the connecting call to the missing child's guardian by identifying the contact number of the missing child's guardian and directly inputting the contact number.

In a case where the missing child finder client 201 is not connected to the missing child's guardian, the missing child finder client 201 may report the child missing to a missing child protection institute positioned close to the missing child finder client 201.

Meanwhile, if the two-dimensional bar-code server 100 searches for the child and guardian information corresponding to the two-dimensional bar code received in the step S406 and transmits the searched child and guardian information to the missing child finder client 201, the two-dimensional bar-code server 100 transmits information of the missing child finder client 201 and the current position information received from the missing child finder client 201 to the guardian client 200 corresponding to the searched guardian information in step S409. In this case, the information of the missing child finder client 201 is a number of the portable terminal corresponding to the missing child client 201.

If the two-dimensional bar-code server 100 transmits the information and position information of the missing child finder client 201 to the guardian client 200 corresponding to the guardian information as described above, the guardian client 200 displays the received position information of the missing child finder client 201, and displays information corresponding to the number of the portable terminal corresponding to the missing child finder client 201 as shown in FIG. 6.

The two-dimensional bar-code server 100 downloads the missing child prevention program so as to generate missing child occurrence information and then transmit the generated information to members that have received two-dimensional bar codes issued through the two-dimensional bar-code server 100.

Here, the missing child occurrence information may be the position information of the missing child finder client 201 and the photograph, name, age, and looks and clothes of the missing child as shown in FIG. 7.

In addition, the two-dimensional bar-code server 100 may transmits the missing child occurrence information to only members positioned in the vicinity of the position information of the missing child finder client 201 according to the setting of the user.

Figure 8:
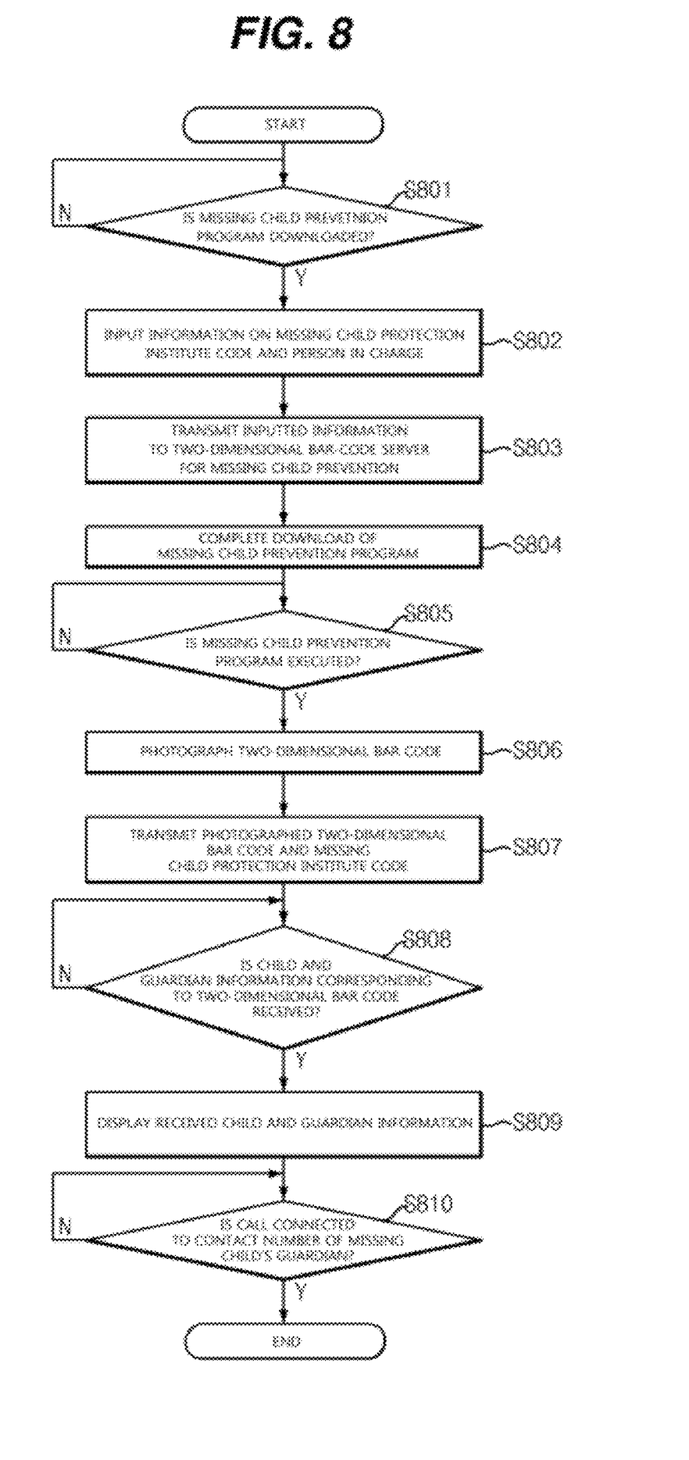
FIG. 8 is a flowchart illustrating a process of performing a missing child search using a two-dimensional bar code in a missing child protection institute according to an embodiment of the present invention.

FIG. 8 is a flowchart illustrating a process of performing a missing child search using a two-dimensional bar code in a missing child protection institute according to an embodiment of the present invention.

In step S801, the missing child protection institute connects the two-dimensional bar-code server 100, and downloads a missing child prevention program and then installs the downloaded program so as to searching for a missing child's guardian using a two-dimensional bar code possessed by a missing child.

In step S802, the missing child protection institute inputs information on a missing child protection institute code and a person in charge so as to register the missing child protection institute to the two-dimensional bar-code server 100.

The missing child protection institute transmits the inputted information on the missing child protection institute code and the person in charge to the two-dimensional bar-code server 100 in step S803, and completes the download and installation of the missing child prevention program in step S804. In this case, the missing child protection institute code is preferably a unique number for classifying missing child protection institutes.

Thereafter, if a missing child occurs, the missing child protection institute executes the missing child prevention program in step S805.

The missing child protection institute photographs a two-dimensional bar code of the missing child in step S806, and transmits the photographed two-dimensional bar code and the missing child protection institute code to the two-dimensional bar-code server 100 in step S807.

Thereafter, if the missing child protection institute receives child and guardian information corresponding to the photographed two-dimensional bar code from the two-dimensional bar-code server 100 in step S808, the missing child protection institute displays the received child and guardian information in step S809.

In step S810, the missing child protection institute attempts a connecting call to a contact number of a missing child's guardian, corresponding to the displayed guardian information.

Accordingly, the missing child finder client 201 and the missing child protection institute can attempt a connecting call to the missing child's guardian using the two-dimensional bar code of the missing child. Further, the missing child finder client 201 and the missing child protection institute can safely hand over the missing child to the missing child's guardian.

As described above, according to the present invention, a name tag or bracelet containing child and guardian information, possessed by a child, is issued as a two-dimensional bar code capable of being attached to child's clothes or worn on a child's arm for the purpose of missing child prevention, so that the child and guardian information cannot be easily exposed to other persons while the child possesses the two-dimensional bar code.

If a person photographs a two-dimensional bar code attached to clothes or name tag of a missing child and transmits the photographed two-dimensional bar code to a two-dimensional bar-code server, the two-dimensional bar-code server transmits guardian information of the missing child to the person, so that it is possible to quickly hand over the missing child to a missing child's guardian.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of searching a missing child using a two-dimensional bar code, which is performed by a portable terminal, the method comprising:
   photographing a two-dimensional bar code possessed by a missing child through a missing child prevention program;
   receiving current position information through a global positioning system (GPS) module and storing the received position information when the missing child prevention program is executed;
   transmitting the photographed two-dimensional bar code and the stored position information to a two-dimensional bar-code server;
   receiving child and guardian information of the missing child from the two-dimensional bar-code server and displaying the received child and guardian information; and
   connecting a call to the missing child's guardian by inputting a call connection key.

2. The method of claim 1, further comprising, prior to photographing the two-dimensional bar code:
   receiving child and guardian information through the missing child prevention program;
   transmitting the child and guardian information to the two-dimensional bar-code server and requesting the two-dimensional bar-code server to generate the two-dimensional bar code; and
   receiving the two-dimensional bar code corresponding to the child and guardian information from the two-dimensional bar-code server.

3. A method of searching for a missing child using a two-dimensional bar code, which is performed by a two-dimensional bar-code server, the method comprising:
   receiving, from a missing child finder client, a two-dimensional bar code possessed by a missing child and photographed by the missing child finder client and position information of the missing child finder client;
   searching for child and guardian information corresponding to the two-dimensional bar code;
   transmitting the searched child and guardian information to the missing child finder client;
   transmitting the information and position information of the missing child finder client to a missing child's guardian using the searched guardian information; and
   generating missing child occurrence information containing the child information and the position information of the missing child finder client and transmitting the generated missing child occurrence information to members that install a missing child prevention program.

4. The method of claim 3, further comprising, prior to receiving the two-dimensional bar code from the missing child finder client:
   receiving child and guardian information from a guardian client; and
   generating a two-dimensional bar code corresponding to the received child and guardian information and transmitting the generated two-dimensional bar code to the guardian client.

5. The method of claim 3, wherein the guardian information is at least one portable terminal number or telephone number, and the guardian information receiving the information and position information of the missing child finder client is a portable terminal number.

6. A method of searching for a missing child using a two-dimensional bar code, comprising:
   photographing, by a missing child finder client, a two-dimensional bar code possessed by a missing child through a missing child prevention program, and receiving current position information through a GPS module and storing the received position information;
   transmitting the photographed two-dimensional bar code and the stored position information to a two-dimensional bar-code server;
   searching for, by the two-dimensional bar-code server, child and guardian information corresponding to the two-dimensional bar code received from the missing child finder client;
   transmitting, by the two-dimensional bar-code server, the searched child and guardian information to the missing child finder client;
   receiving, by the missing child finder client, the child and guardian information of the missing child from the two-dimensional bar-code server and displaying the received child and guardian information; and
   connecting, by the missing child finder client, a call to a missing child's guardian using the received guardian information.

7. The method of claim 6, wherein the guardian information is at least one of a portable terminal number and a telephone number.

* * * * *